Patented Oct. 16, 1951

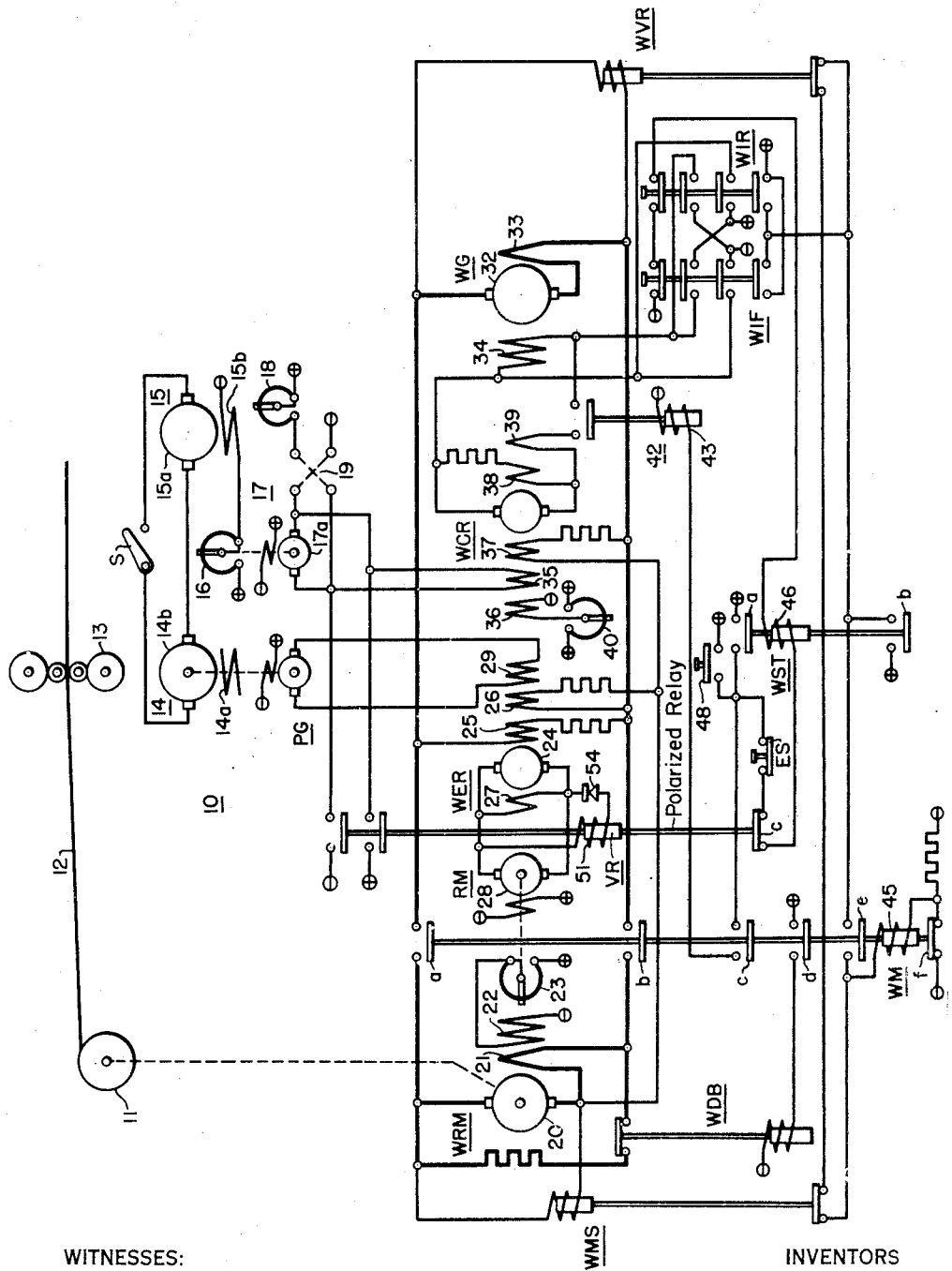

2,571,982

UNITED STATES PATENT OFFICE 2,571,982

EMERGENCY STOP SYSTEM

Amos J. Winchester, Jr., Lockport, and William T. Hunt, Jr., Williamsville, N. Y., assignors to Westinghouse Electric Corporation, East Pittsburgh, Pa., a corporation of Pennsylvania Application October 26, 1949, Serial No. 123,742

8 Claims. (Cl. 318—331)

Our invention relates, generally, to emergency stop systems for motors, and it has reference, in particular, to emergency stop systems for motors in strip mills and the like.

Generally stated, it is an object of our invention to provide an emergency stop system for strip mills which is simple and inexpensive to manufacture, and is reliable and effective in operation.

More specifically, it is an object of our invention to provide, in a control system for a strip mill, for quickly and effectively stopping both the mill and reel motors in the event of a strip breakage.

Another object of our invention is to provide, in the event of breakage of a strip in a strip mill, for utilizing a reversal of polarity of a regulating generator controlling the field excitation of a reel motor to effect an emergency stop of both the mill and reel motors.

It is also an object of our invention to provide, in a control system for a reel motor having current regulating means for controlling the value of its armature current, for utilizing a polarity responsive emergency stop relay for stopping the motor upon reversal of the terminal polarity of a counter E. M. F. regulating generator controlling the operation of a field rheostat in the field circuit of the reel motor.

Other objects will, in part, be obvious and will, in part, be explained hereinafter.

In practicing our invention in accordance with one of its embodiments, the armature of a reel motor, which is connected in driving relation with a reel device operating in conjunction with a mill stand in a strip mill, is supplied with electrical energy from a generator whose output is regulated in accordance with the armature current of the reel motor to maintain a substantially constant value of armature current. The field winding of the reel motor is supplied with electrical energy from a suitable source through a motor operated field rheostat having a rheostat motor energized from a counter E. M. F. regulating generator which is responsive to a differential between the speed of the mill and the counter E. M. F. of the reel motor. An emergency stop relay is connected across the armature of the regulating generator with a rectifier device blocking the flow of current for the normal direction of terminal polarity. When the strip breaks, the motor armature voltage will be increased in an attempt to regulate for a constant value of current, and the terminal polarity of the regulating generator reverses, thus effecting operation of the emergency stop relay to stop both the reel and the mill motors.

For a more complete understanding of the nature and scope of our invention, reference may be made to the following detailed description and the accompanying drawing, in which the single figure is a diagrammatic view of a motor control system embodying the invention in one of its forms.

Referring to the drawing, the reference numeral 10 may denote, generally, a control system for a strip mill or the like wherein a winding reel 11 may be disposed to wind a strip of material 12 as it proceeds through the rolls of a mill stand 13 having a roll motor 14 connected in driving relation therewith.

The mill motor 14 may comprise a field winding 14a disposed to be energized from a suitable source of electrical energy, and an armature 14b. The armature may be supplied with electrical energy through a switch S from a main generator 15, comprising an armature 15a and a field winding 15b. The speed of the motor 14 may be changed by varying the energization of the generator field winding 15b from a suitable source of electrical energy by means of a field rheostat 16 actuated by a rheostat motor 17 disposed to be energized from a reversible variable voltage source represented by a rheostat 18 and reversing switch 19.

The winding reel 11 may be provided with a winding reel motor WRM comprising an armature 20 connected in driving relation with the reel, a commutating field winding 21, and a separately excited shunt field winding 22.

In order to provide for maintaining a substantially constant value of reel motor counter E. M. F. for varying the speed of the reel 11 as the strip 12 is wound thereon, energization of the field winding 22 may be effected from a suitable source of control voltage through a field rheostat 23 disposed to be operated by a rheostat motor RM which may be energized from a winding reel E. M. F. regulating generator WER comprising, an armature 24, a voltage field winding 25, a current field winding 26, a shunt type self-energizing field winding 27 and a pattern field winding 29.

The armature 24 of the regulating generator WER may be connected in circuit relation with the armature 28 of the rheostat motor RM, with the self-energizing field winding 27 connected in shunt relation therewith to provide compensation for the air gap M. M. F. of the regulating generator.

The pattern field winding 29 may be energized from a pilot generator PG connected in driving relation with the roll motor 14 to provide a measure of the strip speed.

The voltage field winding 25 may be connected across the armature of the winding reel motor WRM, and the current field winding 26 may be connected across the commutating field winding 21 of the reel motor, so that the field windings 25 and 26 jointly provide a measure of the counter E. M. F. of the reel motor in opposition to the M. M. F. of the pattern field winding 29.

The armature 20 of the reel motor WRM may be connected for energization from a constant current source being, for example, connected in circuit relation with the armature 32 of a winding reel generator WG having a commutating field winding 33 and a separately excited shunt field winding 34. The shunt field winding 34 may be normally supplied with electrical energy from a winding reel current regulating generator WCR having an inertia compensation field winding 35, a pattern field winding 36, a differential current field winding 37, an antihunt field winding 38, and a self-energizing type of field winding 39.

The pattern field winding 36 may be connected to a suitable source of electrical energy through a control rheostat 40, while the current field winding 37 may be connected in opposed relation across the commutating field winding 21 so as to provide a measure of the reel motor armature current.

The inertia compensation field winding 35 may be connected across the armature 17a of the rheostat motor 17 to provide a measure of the rate of change of the speed of the mill.

The antihunt field winding 38 may be connected in shunt circuit relation with the armature of the regulating generator WCR, while the self-energizing field winding 39 may be connected in series circuit relation with the shunt field winding 34 of the winding reel generator WG, through a control switch 42 having an operating winding 43.

The reel generator WG may be connected to the armature of the reel motor WRM by means of a main switch WM having an operating winding 45. A start relay WST having an operating winding 46 may be provided for energizing the operating winding 45 of the main switch WM in response to operation of a start push-button switch 48. Overvoltage relays WMS and WVR responsive to the armature voltages of the reel motor and the reel generator, respectively, may also be provided for preventing completion of the energizing circuit of the operating winding 45 of the main switch WM, should said voltages exceed safe values.

In order to provide for rapidly stopping both the reel motor WRM and the mill motor 14 in the event that the strip 12 should break, an emergency stop control relay VR may be provided having an operating winding 51. The operating winding may be connected across the armature 24 of the winding reel E. M. F. regulating generator WER in series circuit relation with a rectifier device 54.

The rectifier device 54 may be disposed to block the flow of current through the operating winding 51 when the terminal voltage of the regulating generator WER is of such a polarity as to decrease the speed of the reel motor WRM, such as would generally be the case, except in the event that the strip 12 should break.

An emergency stop push-button switch ES may be connected in series-circuit relation with the emergency stop relay VR to provide for effecting deenergization of the start switch WST.

Inching of the reel motor WRM may be provided for by means of "forward" and "reverse" push-button switches WIF and WIR, which reversibly connect the field winding 34 of the reel generator to a suitable source of electrical energy.

The push button 48 may be actuated to provide an energizing circuit for winding 46 of the start switch WST. This provides an operating circuit for the main switch WM through contact member b of switch WST and contact member f of the main switch. Contact members a and b of the main switch connect the armature 20 of the reel motor to the reel generator WG, while contact member d connects the dynamic braking relay WDB for energization, and contact member e connects the control relay 42 for operation.

In operation, the field strength of the winding reel motor WRM is determined by the E. M. F. of the regulating generator WER, which regulates for a value of motor counter E. M. F. which is proportional to the speed of the mill. Whenever the counter E. M. F. of the reel motor is below what it should be for a given speed of the mill, the ampere turns of the pattern field winding 29 exceed those of the voltage and current field windings 25 and 26, and the difference will be in the direction to strengthen the field of the reel motor.

The voltage of the regulating generator WER will continue to change until the counter E. M. F. of the reel motor is what it should be for a given speed of the mill. When this condition is obtained, the net sum of the ampere turns of the pattern field winding 29, and the voltage and current field windings 25 and 26 will be substantially zero.

At the beginning of a winding operation, the reel motor must run at a relatively high speed because of the small diameter of the coil thereon, and the field of the reel motor will be substantially at a minimum value. As the diameter of the coil on the reel 11 increases, the regulating generator WER functions to strengthen the reel motor field to maintain a counter E. M. F. which is proportional to the speed of the mill.

During operation, the current regulating generator WCR varies the excitation of the shunt field winding 34 of the reel generator WG so as to vary the terminal voltage of the reel generator and maintain a substantially constant value of reel motor armature current. Should the armature current increase, the excitation of the differential current field winding 37 increases and the voltage of the current regulating generator WCR decreases. This decreases the terminal voltage of the reel generator WG, thus reducing the flow of current in the reel motor armature circuit to the desired value.

Should the strip 12 break, the armature current of the reel motor will tend to drop rapidly because of the loss of strip tension, and the output voltage of the reel generator WG will rise rapidly in an effort to maintain a constant value of armature current. This increases the M. M. F. of the differential voltage field winding 25, and upsets the balance of excitation for the regulating generator WER, so that the voltage field winding 25 predominates and reverses the terminal polarity of the regulating generator in an effort to decrease the field excitation of the reel motor WRM, and increase the speed of the motor to restore the counter E. M. F. balance.

Reversal of the terminal polarity of the regulating generator WER results in operation of the emergency stop relay VR. This interrupts the energizing circuit for the operating winding 46 of the start switch WST at contact member c, thus interrupting the holding circuit for the main switch WM at contact member b of the start switch.

The main switch returns to the deenergized position disconnecting the armature 20 of the reel motor WRM from the generator WG, at contact members a and b, and interrupting the energizing circuit for the dynamic braking relay WDB at contact member d, so as to connect the armature 20 of the reel motor for dynamic braking. At the same time, the main switch interrupts the energizing circuit for the control switch 42 at contact member c, to disconnect the regulating generator WCR from field winding 34.

Operation of the emergency stop relay VR also provides an obvious energizing circuit for the armature 17a of the rheostat motor 17, so as to operated the field rheostat 16 in a direction to reduce the output voltage of the generator 15, thereby bringing the roll motor 14 to a stop by regenerative braking.

From the above description and the accompanying drawing, it will be apparent that we have provided in a simple and effective manner for effecting an emergency stop of a strip mill in the event of strip breakage. Our invention may be readily adapted to control systems already in operation with a minimum of expense and change in circuit connections. By utilizing a polarity responsive or polarized emergency stop relay connected to be responsive to the terminal polarity of a counter E. M. F. regulating generator controlling the field excitation of a reel motor in the manner hereinbefore described, the mill may be rapidly and safely brought to a standstill in the event of strip breakage.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

We claim as our invention:

1. In a control system for a motor having a field winding and an armature, a regulating generator connected to maintain a substantially constant value of armature current, circuit means including a motor-operated field rheostat connected to effect energization of the field winding, an additional regulating generator connected to effect operation of the rheostat motor to maintain a predetermined value of motor counter E. M. F., and emergency stop means for the motor including directional responsive means connected to respond to the terminal polarity of the additional regulating generator.

2. A control system for a reel motor having field excitation means comprising, counter E. M. F. regulating means connected to effect energization of the field excitation means to maintain a substantially constant value of motor counter E. M. F., and control means connected to stop the motor including relay means responsive to the polarity of regulating means.

3. In a control system for a motor having a field winding and an armature connected in driving relation with a load, regulating means connected to maintain a predetermined value of armature current, additional regulating means connected to control the supply of electrical energy to the field winding, and directional control means connected to respond to a predetermined direction of change of field energization for stopping the motor.

4. A control system for a motor having a field winding and an armature comprising, current regulating means connected to regulate the value of armature current, counter E. M. F. regulating means connected to regulate energization of the field winding, and emergency stop means including relay means connected to respond to the counter E. M. F. regulating means.

5. In a control system for a motor having a field winding and an armature, circuit means connected to effect energization of the armature including current regulating means operable to maintain a predetermined value of armature current, additional circuit means connected to effect energization of the field winding including additional regulating means responsive to the counter E. M. F. of the motor, and emergency stop means for the motor including a polarized relay energized from said additional regulating means.

6. The combination, with a motor connected in driving relation with a work device disposed to work on a strip of material, of an additional motor connected in driving relation with a device for winding the strip, regulating means connected to supply field excitation to the additional motor to maintain a substantially constant value of motor counter E. M. F., and control means operable to stop the additional and work device motors including relay means selectively responsive to the polarity of the regulating means.

7. In combination, a motor connected in driving relation with a work device disposed to handle a strip of material, a master rheostat operable to effect variable energization of the motor, an additional motor having a field winding and an armature connected in driving relation with a device disposed to wind the strip of material as it comes from the work device, circuit means connected to effect constant current energization of the armature of said additional motor, regulating means connected to effect energization of the field winding of said additional motor to maintain a constant value of motor counter E. M. F., and control means connected to effect emergency stopping of the work device and winding device motors in the event of strip breakage, said control including a polarized relay connected to respond to a reversal of output voltage of the regulating means.

8. The combination, with a motor connected in driving relation with a work device and an additional motor having field excitation means and an armature connected in driving relation with a device to wind a strip proceeding from the work device, of counter E. M. F. regulating means connected to regulate field excitation of the additional motor to maintain a substantially constant value of motor counter E. M. F., current regulating means connected to maintain a constant value of motor armature current, and emergency stop means connected to stop both motors including an emergency stop relay and a rectifier device so connected across the regulating means as to be operable when the polarity thereof reverses when the strip breaks.

AMOS J. WINCHESTER, Jr.
WILLIAM T. HUNT, Jr.

REFERENCES CITED

The following references are of record in the file of this patent:

UNITED STATES PATENTS

| Number | Name | Date |
|---|---|---|
| 2,264,277 | Cook | Dec. 2, 1941 |
| 2,339,939 | Michel | Jan. 25, 1944 |
| 2,342,790 | Cook | Feb. 29, 1944 |
| 2,437,973 | Schmitz | Mar. 16, 1948 |
| 2,444,248 | Crever | June 29, 1948 |
| 2,451,901 | Auburn | Oct. 19, 1948 |